(12) United States Patent
Lu

(10) Patent No.: US 9,405,118 B1
(45) Date of Patent: Aug. 2, 2016

(54) OPTICAL CLOAKING SYSTEM

(71) Applicant: Weimin Lu, Novi, MI (US)

(72) Inventor: Weimin Lu, Novi, MI (US)

( * ) Notice: Subject to any disclaimer, the term of this patent is extended or adjusted under 35 U.S.C. 154(b) by 626 days.

(21) Appl. No.: 13/714,770

(22) Filed: Dec. 14, 2012

Related U.S. Application Data

(60) Provisional application No. 61/646,570, filed on May 14, 2012.

(51) Int. Cl.
*G02B 27/00* (2006.01)
*G02B 5/04* (2006.01)

(52) U.S. Cl.
CPC *G02B 27/00* (2013.01); *G02B 5/04* (2013.01); *G02B 27/0075* (2013.01)

(58) Field of Classification Search
CPC ........... G02B 27/10; G02B 27/00; G02B 5/04
USPC ......................................................... 359/837
See application file for complete search history.

(56) References Cited

U.S. PATENT DOCUMENTS

| | | | |
|---|---|---|---|
| 5,392,161 A * | 2/1995 | Weder et al. | ................... 359/861 |
| 7,206,131 B2 | 4/2007 | Alden | |
| 8,094,378 B2 | 1/2012 | Kildishev et al. | |
| 2002/0090131 A1* | 7/2002 | Alden | ........................... 382/154 |
| 2003/0047666 A1* | 3/2003 | Alden | ....................... 250/208.1 |
| 2006/0131478 A1* | 6/2006 | Alden | ....................... 250/208.1 |

FOREIGN PATENT DOCUMENTS

CN 202314974 * 12/2011 ............... G02B 6/00

OTHER PUBLICATIONS

Chen et al. "Broadband polygonal invisibility cloak for visible light," Scientific Reports 2:255 pp. 1-4, 2012.*
Barnstone, "'Cloaking' device uses ordinary lenses to hide objects across range of angles," http://www.rochester.edu/newscenter/watch-rochester-cloak-uses-ordinary-lenses-to-hide-objects-across-continuous-range-of-angles-70592/; 2014.*
Szczurowski, graph of the refractive index of PMMA, 2013.*
Rakic, graph of the refractive index of Silver, 1998.*
Rakic, graph of the refractive index of Aluminum, 1998.*
Schalaev, Nature Photonics, vol. 1, pp. 41-48, 2007.*
Hecht, Optics, p. 56, 1987.*

* cited by examiner

*Primary Examiner* — Zachary Wilkes
*Assistant Examiner* — George G King
(74) *Attorney, Agent, or Firm* — Carrier Blackman & Associates, P.C.; Joseph P. Carrier; William D. Blackman

(57) ABSTRACT

An optical cloaking system which optically cloaks/hides an object in the visible light spectrum such that the object appears invisible, while permitting a background behind the object to be viewed substantially without distortion. The system includes at least one optical device manufactured using common optical materials in the form of prisms, lenses, mirrors, and the like, which is placed between an observer an the object to be cloaked, and the optical device bends and/or compresses light such that the light passes around a cloaked space in which an object is disposed, and the observer viewing a larger space including the cloaked space will not see the object, but will see a background behind the object in full view substantially undistorted in relation to the rest of the larger space.

5 Claims, 19 Drawing Sheets

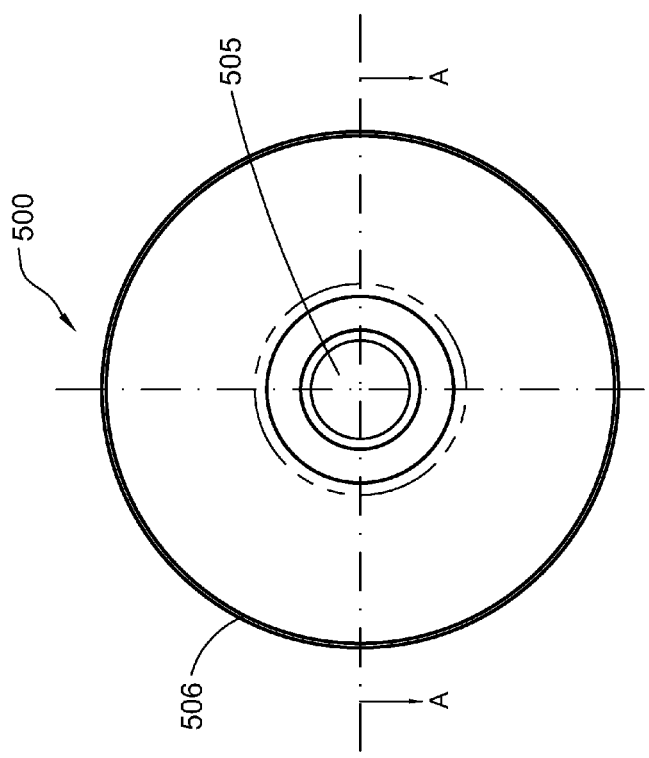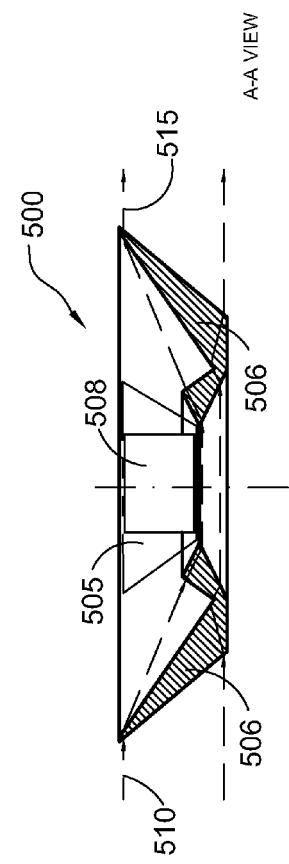
FIG. 9A
FIG. 9B

OPTICAL CLOAKING SYSTEM

CROSS REFERENCE TO RELATED APPLICATIONS

The present application claims priority from U.S. Provisional Patent Application 61/646,570. The entire disclosure of this prior application is incorporated herein by reference.

BACKGROUND OF THE INVENTION

1. Field of the Invention

The present invention relates to an optical cloaking system, and in particular, to an optical cloaking system which can optically cloak/hide objects in the visible light spectrum such that the objects appear invisible, and which can be efficiently and practically manufactured using common optical materials in the form of prisms, lenses, mirrors, and the like to. Such optical cloaking system bends and/or compresses light such that, within the system, the light passes around a cloaked space in which an object is disposed, and a person viewing a larger space including the cloaked space will not see the object, but in certain embodiments will see a background behind the object in full view substantially undistorted in relation to the rest of the larger space.

2. Description of the Background Art

A concept of cloaking or hiding objects by making them appear invisible is known. An example of such concept is illustrated in a magician's trick involving the illusion of invisibility. In such an illusion, a first mirror is placed in front of an object to be hidden, a second mirror is placed above and away from the object to be hidden, and a third mirror is placed behind the object to be hidden. The mirrors are positioned such that light is reflected from the third mirror, to the second mirror and then to the first mirror, such that a viewer positioned in front of the first mirror would see the reflection of the object located behind the third mirror. As such, it appears to the viewer that the object has disappeared. However, such an illusion is highly limited in its practical applications, e.g., due to the need for the second mirror being hidden in a ceiling or the like. Thus, such a trick is not easily adapted to different situations or settings because the second mirror must be attached somewhere located remotely away from the object itself.

Another known example in the field of camouflaging an object to render it invisible uses a camera to capture an image the background of an object and a projector to project the captured image directly onto the object. In such a technology, a camera or several cameras are used to capture the image of the background behind an object. The object preferably is coated or covered in some type of reflective material. A projector is then used to project the image taken by the camera (and manipulated using some form of image processing), onto the object itself or onto a screen that displays the background image in front of the object to be hidden. Again, there are known disadvantages with such projection-type camouflaging. For example, the surface of the object to be hidden emits and/or reflects light such that the projection of the image may appear distorted or not lined up with the background. Further, the image being projected on the object or onto the screen is projected in two-dimensions and as such does not have the stereo-feeling/effect when seen by human eyes.

As yet another example, it is known to use carbon nanotubes to create a "mirage" type effect to hide/cloak an object. In such a technology, carbon fibers are electrically heated to very high temperatures. The extreme temperature changes of the carbon fibers cause light waves to be reflected in a field of vision. However, in order to see the "mirage" effectively, the viewing angle must be almost parallel to the objects surface. Thus, the object may not appear invisible from a straight-on view point. Moreover, while the object may not be seen by a viewer, neither is the background of the object. Instead, it appears more as if there were a mirror being placed between the object and the viewer rather that the object being invisible.

Moreover, there have been some advancements in the area of metamaterials, which are artificial materials engineered to have properties which are not found in nature. For example, in U.S. Pat. No. 8,094,378, a method is described of using metamaterials to create a hypelens or superlens that guide or bend electromagnetic waves. However, with such a method, the materials being used are not common optical materials and as such are difficult to develop and are relatively expensive.

Further, other sophisticated artificial metamaterials having a negative refractive index have been used to hide extremely small objects (similar to the size of a red blood cell) in visible light. However, materials with a negative refractive index do not occur in any natural material and the known artificially created metamaterials with a negative refractive index are only capable of cloaking a micro-object. As such, metamaterials with a negative refractive index would not be useful in any practical application for cloaking an object.

Research has also been done using plasmonic metamaterials to hide an object using microwave frequencies. However, it was only possible to cloak the object in microwave frequency. Thus, such technology would not hide an object within the visible light spectrum.

Still further, other known materials have been used to hide objects. For example, calcite crystals have been used to in conjunction with polarized light to hide an object. However, because the calcite crystals must be used in conjunction with polarized light, such a method would not work within the visible light spectrum. As another example, rare materials with a much higher refractive index, called anisotropic birefringent materials, have been used to hide a macro object in visible light within a maximum diameter of 3 mm. However, such a method is not very useful for practical applications, as such rare materials are not commonly accessible and the size of the object to be hidden is limited to below 3 mm.

Thus, while there are several known optical cloaking systems and methods, these have disadvantages and limitations associated therewith, including those briefly discussed above. Hence, a need still exists in the art for an improved, more efficient and practical optical cloaking system which functions in visible light. In particular, there is a need for such an improved, optical cloaking system involving common optical materials that can cloak an object (allowing it to appear invisible) in visible light, which is portable or easily movable but is still large enough in size to hide almost any object, which has quality with little distortion, and which can be economically manufactured.

SUMMARY OF THE INVENTION

It is an aspect and object of the present invention to provide an improved optical cloak which satisfies the discussed need.

According to a first aspect of the present invention there is provided an optical cloaking system is provided for cloaking an object in visible light, comprising: a first optical device configured to be disposed adjacent to the object, the optical device including a first portion which compresses and bends incident light rays thereon at a predetermined angle to a direction of the incident light rays and passes the compressed and bent light, and a second portion which further compresses and bends the light rays, and passes the light rays in a direction substantially parallel to the direction of the incident. A surface of the second portion from which the further bent and compressed light rays are passed is disposed at a peripheral portion of the optical device and outside of a periphery of the object from a viewpoint of an observer positioned with the optical device between the observer and the object. Also, the optical device may be formed of one or more materials having a positive refractive index.

The optical cloaking system according to the first aspect of the present invention is very advantageous over known optical cloaking systems and methods, including those described above, because it can be implemented in a practical and economical manner. For example, the optical device used in the system may be constructed of common optical materials, with positive refractive index such as glass and transparent plastics including acrylic and polycarbonate, while the optical cloaking device according to the present invention can be formed to cloak an object of substantially any size. Further, the optical cloaking device of the present invention does not require any moving parts or any type of signal reception or processing. Thus, the optical cloaking device of the present invention can be economically manufactured using materials that can be readily obtained and mass produced, and because the optical cloaking device of the present invention does not use camera, screens, electricity or the like, the structure is much more easily portable than most known structures. Also, the common material can be precisely manufactured into optical devices of desired shapes.

According to a second aspect of the present invention, in addition to the first aspect, the optical cloaking system includes a second optical device having a structure which is symmetrical and mirrored to that of the first optical device when the first and second optical device are disposed on opposite sides of the object. Further, it is possible to connect the two optical devices as a single structure such that the cloaked space in which an object may be hidden has a fixed location within the structure. For example, the structure of the connected optical devices could be formed to extend in a substantially circular shape with the cloaked space at a center thereof, whereby the cloaked space is fully surrounded (360°) within the structure.

The optical cloaking system according to the second aspect is very advantageous because the background behind the object appears stereo-displayed with almost no image distortion to the observer. With such arrangement the first optical device bends and compresses the incident light to pass around the object in the direction parallel to the incident light, and then the second optical device, symmetrically arranged relative to the first on the opposite side of the object, decompresses and bends the light such that the light passing from the second optical device is returned to the original beam width and direction of the incident light. Hence, the background image is viewed by an observer substantially without distortion, and even though the observer cannot see the object that is actually disposed between the observer and the background image and which would normally block the view of the background image if the optical cloaking system were not present. In other words, the background image is fully viewed by the viewer up to the very edges of the optical cloaking system just as if there was nothing in front of the background, and substantially without distortion relative to the larger space where the system is disposed. Thus, the present invention is quite distinct from the known system which projects/displays the background image onto an object, and which suffers distortion due to emitted and reflected light.

Further areas of applicability of the present invention will become apparent from the detailed description provided hereinafter. It should be understood that the detailed description and specific exemplary examples, while indicating the present embodiments of the invention, are intended for purposes of illustration only and are not intended to limit the scope of the invention.

BRIEF DESCRIPTION OF THE DRAWINGS

FIG. 9A is a top view of a modification to the optical cloaking system of FIG. 1, wherein the optical devices of the system are integrally joined together and completely surround the object to be hidden.

FIG. 9B is a cross-sectional view of the optical cloaking system of FIG. 9A, taken along the line A-A.

DETAILED DESCRIPTION OF THE PRESENT ILLUSTRATIVE EMBODIMENTS

A number of selected illustrative embodiments of the invention will now be described in some detail, with reference to the drawings. It should be understood that only structures considered necessary for clarifying the present invention are described herein. Other conventional structures, and those of ancillary and auxiliary components of the system, are known and understood by those skilled in the art. These illustrative embodiments are optical cloaking systems and various components of such systems.

Figure 1:
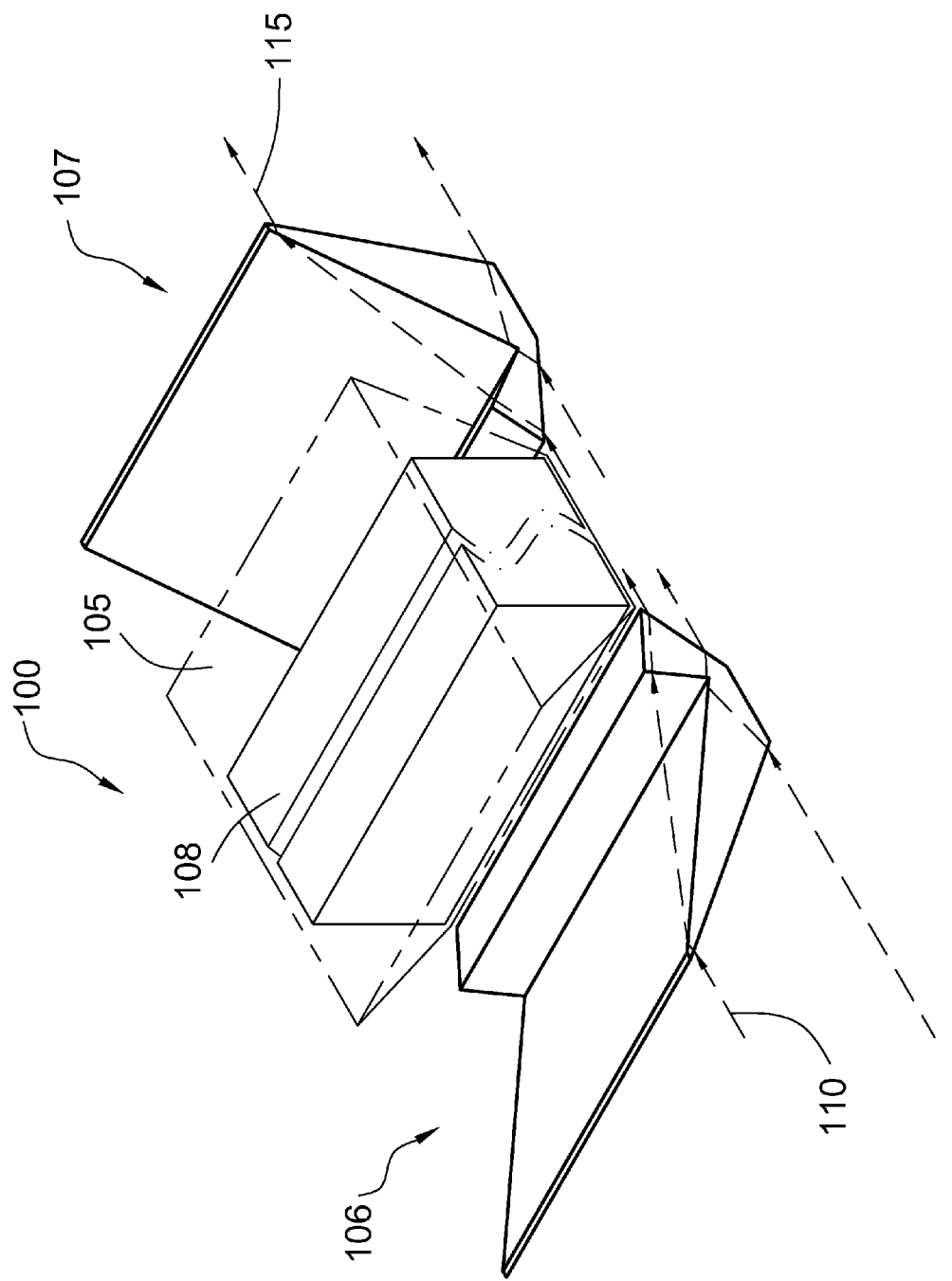
FIG. 1 is a perspective view of an optical cloaking system according to an illustrative embodiment of the present invention involving optical devices formed using wedge prisms.
Figure 2:
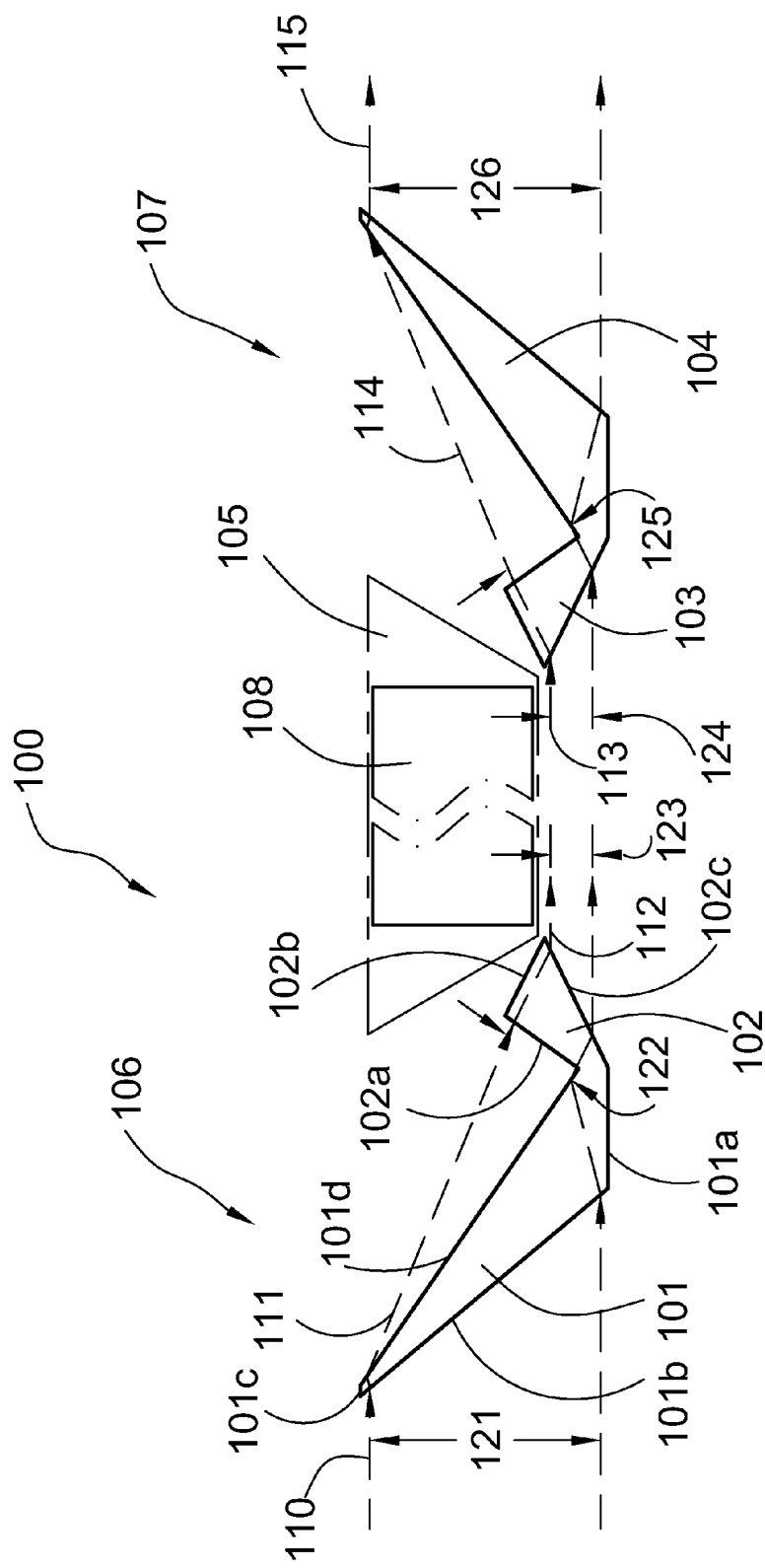
FIG. 2 is a side view of the optical cloaking system of FIG. 1.

Referring now to the FIGS. 1 and 2, there is shown an optical cloaking system according to a first illustrative embodiment of the present invention, generally denoted by reference numeral 100, comprising a first optical device 106 and a second optical device 107 which has a mirror image or symmetrical structure to that of the first optical device 106, with the two devices 106, 107 disposed symmetrically on opposite sides of an object cavity or cloaking space 105 in which an object 108 may be disposed for being cloaked.

The first optical device 106 consists of a tilted, point-up first optical wedge prism 101 and a tilted, point-down second optical wedge prism 102 which may extend continuously from each other along a small interface as shown. The optical devices may be formed of common optical materials having a positive refractive index such as transparent glass, and transparent plastics such as acrylics and polycarbonate. This is desirable because such material are readily available, are relatively inexpensive, can be mass produced with sufficiently high precision to avoid most optical distortion, etc. Of course, other materials having appositive refractive index may be used to form the optical devices, and may posses better qualities than transparent glass, and transparent plastics. For example, diamond would be an appropriate material because it is transparent and has a greater refractive index than glass or plastic, and hence could be made with a smaller depth/thickness while achieving appropriate results. However, diamond is prohibitively expensive to in a shape and size suitable for cloaking most objects as a practical matter.

The first optical prism 101 has a substantially triangular cross section, with a first surface 101a that may be positioned on the ground or other support surface. A second surface 101b which extends at an angle from the first surface 101a to a point 101c at a top end of the prism. A third surface 101d extends at an angle from the point 101c to a first surface 102a of the second optical prism 102 forming a desired angle therebetween. A second surface 102b of the second optical prism 102 connects the first surface 102a with a third surface 102c which then connects back to the first surface 101a of the first optical prism 101. The first and second optical prisms 101 and 102, respectively, may be joined together such that they form a single optical device as depicted, which facilitates manufacture thereof and also reduces the amount of surface area of the optical device which can undesirably collect dust, water and other foreign matter that reduces clarity of the background observed through the optical device. The second optical device 107 is a structure symmetrical to the first device and consists of a tilted, point-down first wedge prism 103 and a tilted, point-up second wedge prism 104 joined together.

The structure of the second optical device 107 is the same as the first optical device 106 and as such has been omitted from this description.

While an object 108 of any shape and/or size may be positioned within the object cavity 105, for the purposes of illustration, a simple box/cube is shown as the object. Furthermore, the slanted hatching at the center of the object 108 denotes that the object may be of any length/size and as such the space within the cavity necessary for cloaking for the object cavity may be adjusted accordingly. In this regard, because the compressed light beam 112/113 which passes between the optical devices 106, 107 moves in a direction parallel to the direction of the surface on which the devices are disposed, the devices may be simply moved closer to or further apart from each other in order to adjust a length of the object cavity 105. For adjusting height and width of the object cavity, the size and shape of the optical devices 106, 107 may be appropriately adjusted.

As seen in FIG. 2, the optical devices 106, 107 are sized and/or shaped such that a bottom of object cavity 105 (and thus the bottom of the object 108 to be cloaked) is located in spaced relation above the bottom of the first and second optical devices, thus forming a space through which the optical devices may pass light around the object cavity without being obstructed by an object disposed within the cavity. Of course such space for passing light around the cavity need not be located below the cavity, but could located anywhere around the cavity. The optical devices can be appropriately sized and shaped to accommodate the object cavity 105 for any given sized and shaped object.

In the optical device 106 the second surface 101b of the first prism 101 receives light 110 that is incident on the optical device from the viewpoint of an observer standing to the left of the optical device 106 in FIG. 2. When the light beam 110 from a light source such as the sun (not shown), with a beam width 121, which is preferably comprised of light within the visible light spectrum, shines on the second surface 101b of the first prism 101, because of the refraction through the prism 101 and the tilted angles of side surfaces of the prism 101, the width 121 of light beam 110 is compressed and bent to become a light beam 111, having a beam width 122, which becomes incident on the first face 102a of the second prism 102. Then because of the refraction through the prism 102 and the tilted angles of the side surfaces of prism 102, the light beam 111 is further compressed and bent to become the a light beam 112/113 passing from the third face 102c of the second prism 102 to the symmetrically opposing face of the first optical prism 103 of the second optical device 107, which beam 112/113 has a compressed width 123/124 much less than the width 121 of the original incident beam 110, but extends substantially parallel to the original incident light beam at a location outside of a periphery of the object 108, again, below the object in the depicted embodiment.

When light beam 112 with beam width 123 traveling along the underside of the object cavity 105 to become the incident light 113 with beam width 124 on the first optical prism 103 of the second optical device 107, due to the refraction through the first optical prism 103 and the tilted angles of the side surfaces of the first optical prism 103, the light beam 113 is decompressed and bent to become the light beam 114 having beam width 125. Since the size and angles of the first optical prism 103 of the second optical device 107 are the same as the size and angles of the second optical prism 102 of the first optical device 106, only in mirror image, the beam width 125 of the light beam 114 is substantially the same as the beam width 122 of the light beam 111.

The light beam 114 then becomes incident on the second optical prism 104 of the second optical device 107, and due to the refraction through the second optical prism 104 and the tilted angles of the side surfaces of the second optical prism 104, the light beam 114 is further decompressed and bent to become the light beam 115 having beam width 126 which is essentially the same as beam width 121 of the original incident beam 110 and extends in a direction parallel to the incident beam 110. Again, because the size and angles of the second optical prism 104 of the second optical device 107 are the same as the size and angles of the first optical prism 101 of the first optical device 106, only in mirror image, the width 126 of the light beam 115 is substantially the same as the beam width 121 of the light beam 110.

Because the incident beam has the same width and direction as the light beam 115 emitted from optical device 107, and because the optical devices 106, 107 are formed using transparent material, an observer viewing in the direction of the optical cloaking system 100, would not see the optical devices 106, 107 or the object 108 disposed in the cavity 105 between the devices, but instead would see a substantially undistorted view of the background behind the second optical device 107. In other words, the system 100 makes it appear to the observer that the light travels unobstructed in a straight line through the cloaking system as if the system and the object are not present or are invisible.

As discussed above, the devices 106, 107 are each formed using two prisms which are combined. For purposes of better understanding how the devices 106, 107 a description is provided below, with reference to FIG. 19 herein, of how a wedge prism generally functions from a mathematical/geometrical point of view. According to an important aspect of the present invention the optical devices are formed using common optical materials, such as the wedge prism of FIG. 19, such that the optical cloaking system can be efficiently and practically manufactured.

Figure 19:
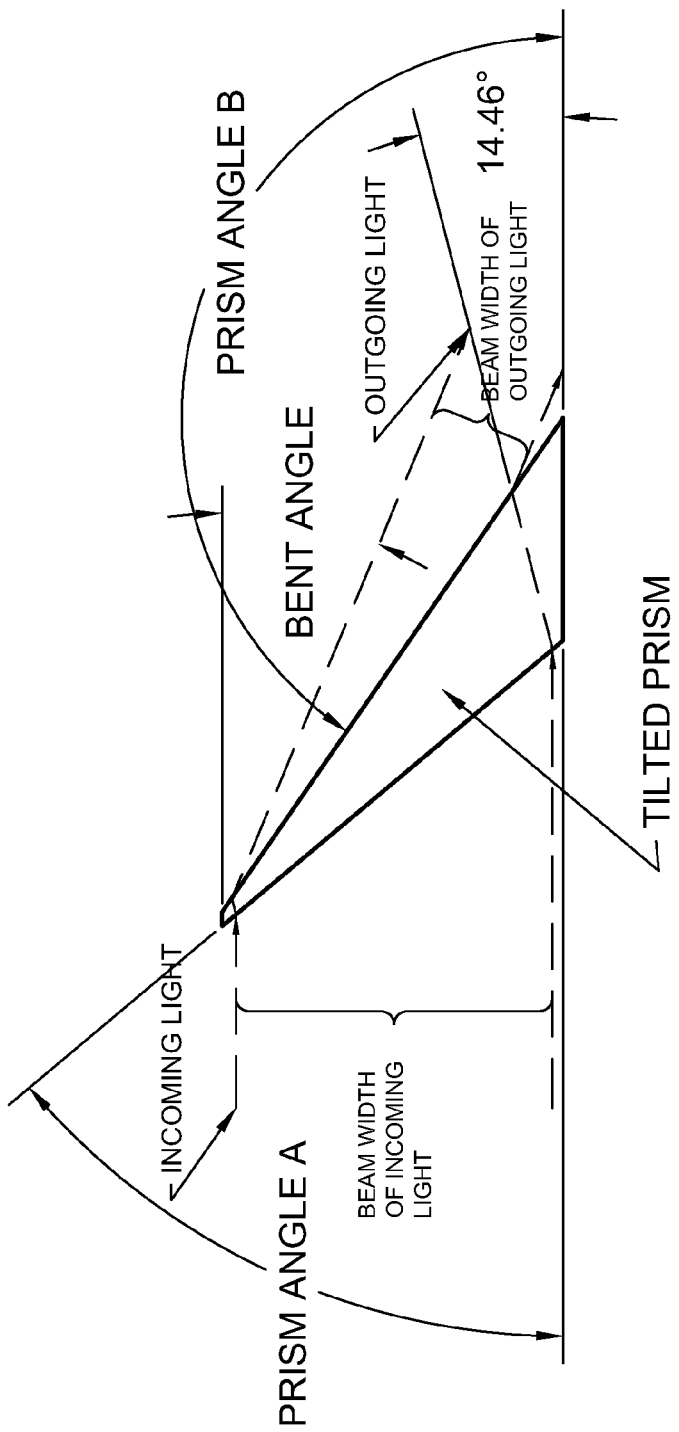
FIG. 19 is a side view explaining how a wedge prism bends and compresses light which is incident thereon.

In FIG. 19 there is shown a tilted wedge prism with three sides, i.e., a bottom side, one side extending from the bottom side up to a top point of the prism at an angle A and which receives incident light, and a another side extending between the top point and the bottom side at an angle B to the bottom side and from which light is passed. If the incident light source is visible and parallel to bottom side as shown, the outgoing visible light heads in the direction with the BentAngle:

BentAngle=PrismAngle$B$−90 deg.+arcsin($n$*sin(PrismAngle$A$+PrismAngle$B$+arcsin(cos(PrismAngle$A$)/$n$)))     (Equation A)

and the compression rate of the beam width of incoming light over the beam width of outgoing light is:

CompressionRate=sin(PrismAngle$B$−BentAngle)*sin(arcos(cos(PrismAngle$A$)/$n$))/(sin(PrismAngle$A$)*sin(arcos(cos(PrismAngle$B$−BentAngle)/$n$)))     (Equation B)

where the refractive index of air is 1, the refractive index of the material of prism is n, the tilted angle of the prism facing incoming visible light is PrismAngleA and the tilted angle of the prism facing outgoing visible light is PrismAngleB.

As an example of the embodiment of the optical system shown in FIGS. 1 and 2 and using the above Equations A and B, in calculations for an optical cloaking device as described above, if the tilted prism is made of acrylic with refractive index of 1.491, then PrismAngleA is 50 degrees and PrismAngleB 145.46 degrees. As such, the BentAngle is −22.55 deg and the beam width compression rate is 32.4 percent.

In the wedge prism of FIG. 19, as in the optical devices 106, 107 in FIGS. 1,2, it is desirable for the prism surfaces on which incident light enters to be at an angle other than 90° to the direction of the incident light, such as shown, for at least two reasons. First, if the surfaces which the incident light enters were to extend at an angle of 90° to the direction of the incident light, the surfaces would tend to reflect a significant amount of the light. Second, in each of the optical devices 106, 107 if the incident light enters the surface at 90° the light may not be refracted sufficiently/downwardly upwardly for the light to properly pass between the two joined prisms forming the device and be emitted in a direction parallel to that of the incident light beneath/around the object cavity 105.

Although the optical devices 106, 107 in the system 100 each include two prisms which have been combined, it is possible to form the optical devices using a greater number of prisms, as long as the basic functioning remains the same, e.g., the incident light is bent and compressed to pass unobstructed around the object, and then is bent and decompressed such that the outputted light beam has essentially the same size and directivity as the incident beam. For example, each of the devices 106, 107 may include three or more prisms. Such a modification may be generally desirable in that the size of each of the prisms may be reduced. However, there may be drawbacks to such a modification, e.g., the longitudinal length of each optical device, e.g., a distance between the initial face of a first prism that receives incident light and the face of the last prism which outputs the compressed light beam that passes around the cavity 105, will most likely increase, the structure of the devices may be have increased complexity for manufacturing, there may be additional surface area to be contaminated with water, dust, or other foreign matter that reduces optical clarity, etc.

In the depicted embodiment, the optical cloaking system 100 compresses and decompresses the beam of incident light only in one direction, i.e., in a height (up and down) direction. It is possible to alternatively construct the first and second optical devices 106, 107 such that they compress the incident light in two directions, e.g., in height and width directions, or to compress the incident light only in the width direction, but such alternative structures would undesirably tend to generate distortion which is more easily perceived by the human eye, particularly in the background behind the system 100. In order to minimize any distortion of the background, the system 100 of the present invention preferably compresses and decompresses the light in only one direction (either the width or the height), and most preferably only in the height direction. Additionally, because the optical devices 106, 107 are formed entirely using common optical materials such as transparent glass and transparent plastics, and do not have any type of frame or peripheral edges formed of non-transparent or opaque materials, it possible for an observer to view the background behind the optical devices seamlessly right up to the edges the optical devices.

While in the above-described embodiment the optical devices 106, 107 each includes a pair of prisms positioned on either side of object to be cloaked, it is possible to vary the structures of the optical devices while achieving essentially the same results. Some possible variations are described below in reference to FIGS. 3-18. Also, each of such variations can be further modified by increasing the number of optical devices on each side of the object cavity 105 similarly to modification to the devices 106, 107 such as discussed above.

Figure 3:
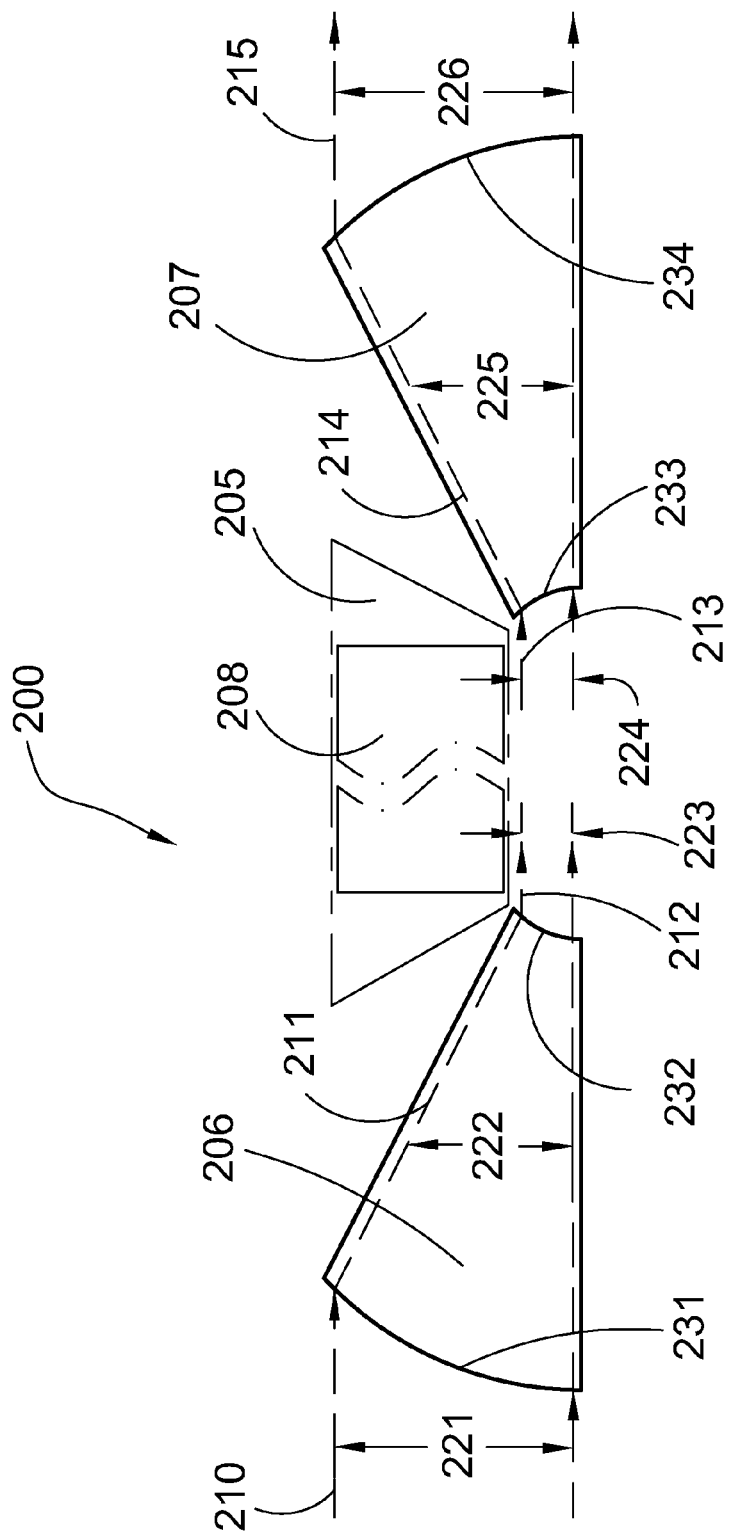
FIG. 3 is a side view of an optical cloaking system according to another illustrative embodiment of the present invention involving optical devices formed using a combination of convex and concave cylindric lens.
Figure 4:
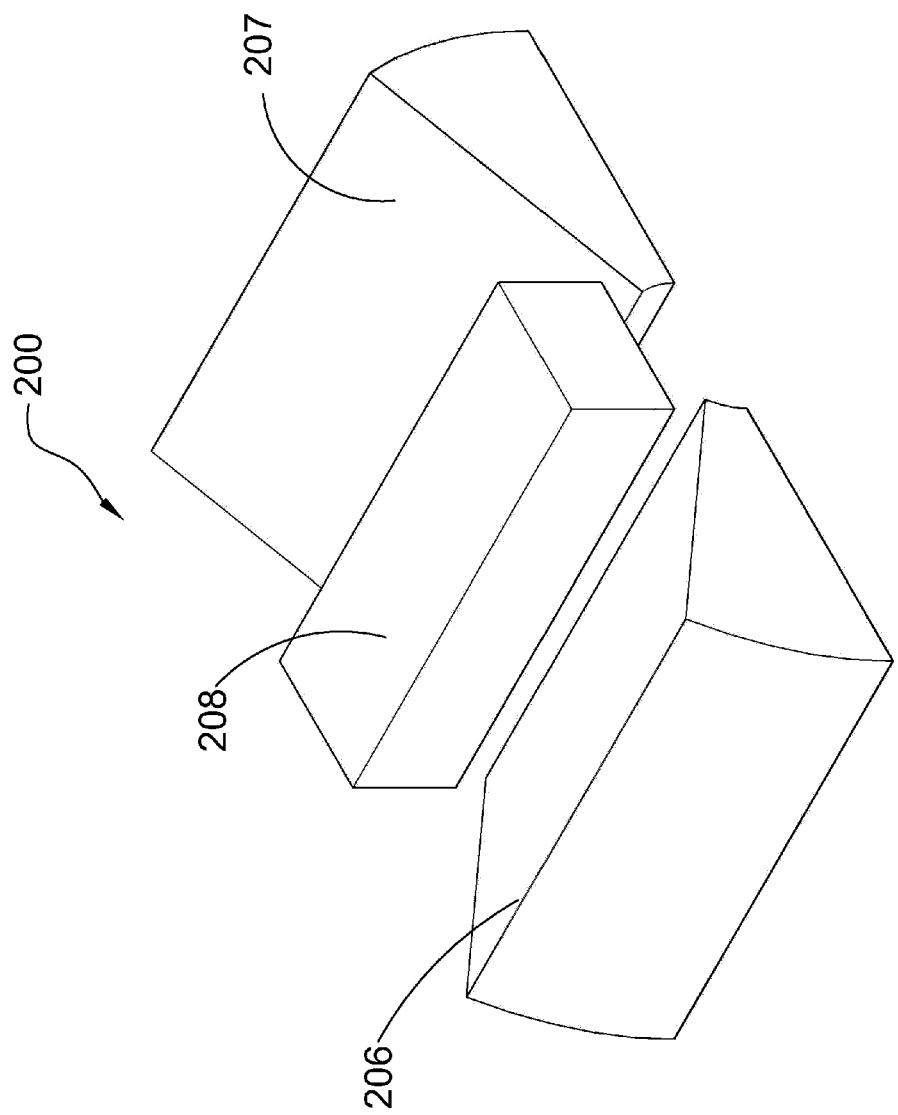
FIG. 4 is a perspective view of the optical cloaking system of FIG. 3.

Referring now to FIGS. 3 and 4, there is shown an optical cloaking system 200 according to another illustrative embodiment of the present invention, which includes a pair of optical devices 206, 207, and an object cloaking cavity 205 therebetween. The optical devices may be constructed of common optical materials having a positive refractive index similar to the optical devices 106, 107 in FIGS. 1 and 2 discussed above. A first optical device 206 consists of a thick cylindric lens with a partial convex surface 231 which receives incident light 210 and a partial concave surface 232 from which compressed light is emitted to pass around the cloaking cavity 205. A second optical device 207 has a symmetrical or mirrored structure to that of the first optical device 206 and consists of a thick cylindric lens of a partial concave surface 233 and a partial convex surface 234 which receives the light emitted from the first device 206 and decompresses and bends it back to the same dimensions and directivity as the original incident light beam 210. When the incident beam 210 shines on the convex surface 231, because of the converging refraction of the convex surface 231 and the tapered shape of the device 206, the width 221 of light beam 210 is compressed and bent to become the light beam 211 with beam width 222 inside the optical device 206. Then, the light beam 211 passes to the concave surface 232, and because of the diverging refraction of the concave surface 232, and the tapered shape of the device 206, the light beam 211 is further bent and decompressed and output as light beam 212 having the beam width 223 and a direction parallel to the visible incident beam 210. Given the wedge shape of the optical device 206 and the convex surface 231 which receives the incident light, the light would be focused to a point if not for the concave surface 232.

The light beam 212 with the beam width 223 travels along the underside of the cavity 205 to become the light beam 213 with the beam width 224. Again, the size, shape and spacing of the optical devices 206, 207 can be adjusted to accommodate the cavity 205 with appropriately sized space for the object 208 to be cloaked/hidden.

When light beam 213 shines on the concave surface 233, because of the diverging refraction of the concave surface 233, the beam width 224 of light beam 213 is decompressed and bent to become the beam width 225 of the light beam 214 inside of the second optical device 207. Then, the light beam 214 goes to the convex surface 234, because of the converging refraction of the convex surface 234, the light is compressed and further bent. The outcome is the light beam 215 having a beam width 226 and traveling in a direction parallel to the visible incident light 210.

The optical cloaking system 200 achieves essentially the same advantages as the optical cloaking system 100 of the first embodiment. For example, because the optical devices 206, 207 are transparent, and because the beam width 221 of incident light beam 210 of the light source (not shown) are arranged to be same as the outgoing beam width 226 of the light beam 215 with the same path, a person viewing the optical cloaking device 200 from the direction of the incident light beam 210, would not see the system or the object 208 disposed between the first optical device 206 and the second optical device 207, but instead would see the background behind the second optical device 207 substantially undistorted. Thus, while the visible light source 210 shines through the apparatus 200 to fully display the background behind, it indeed cloaks or renders invisible the object 208 in the cavity of 205.

However, due to the simpler shape of the optical devices 206, 207 in comparison to that of the devices 106, 107, the devices 206, 207 can be manufactured more easily and economically than the devices 106, 107. On the other hand, the devices 206, 207 tend to have a larger longitudinal dimension than that of the devices 106, 107, which may be undesirable.

Figure 5:
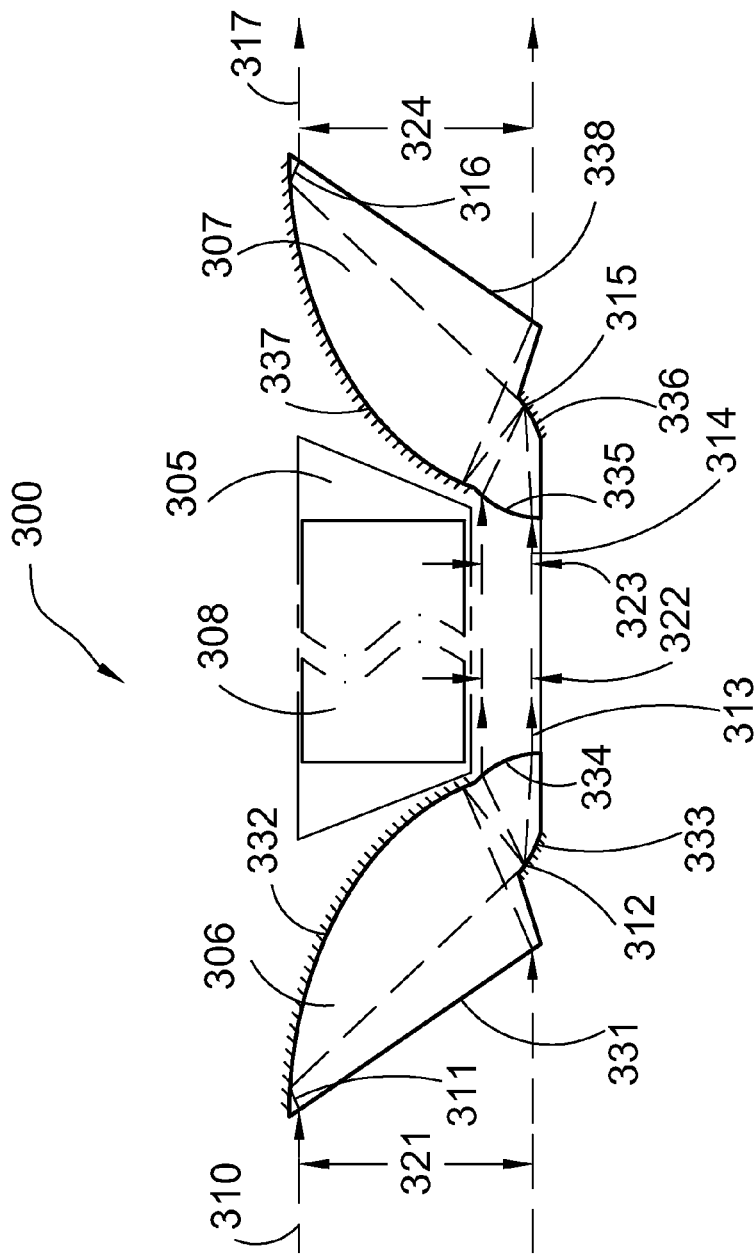
FIG. 5 is a side view of an optical cloaking system according to another illustrative embodiment of the present invention involving optical devices formed using a combination of cylindric lens and cylindric mirrors.
Figure 6:
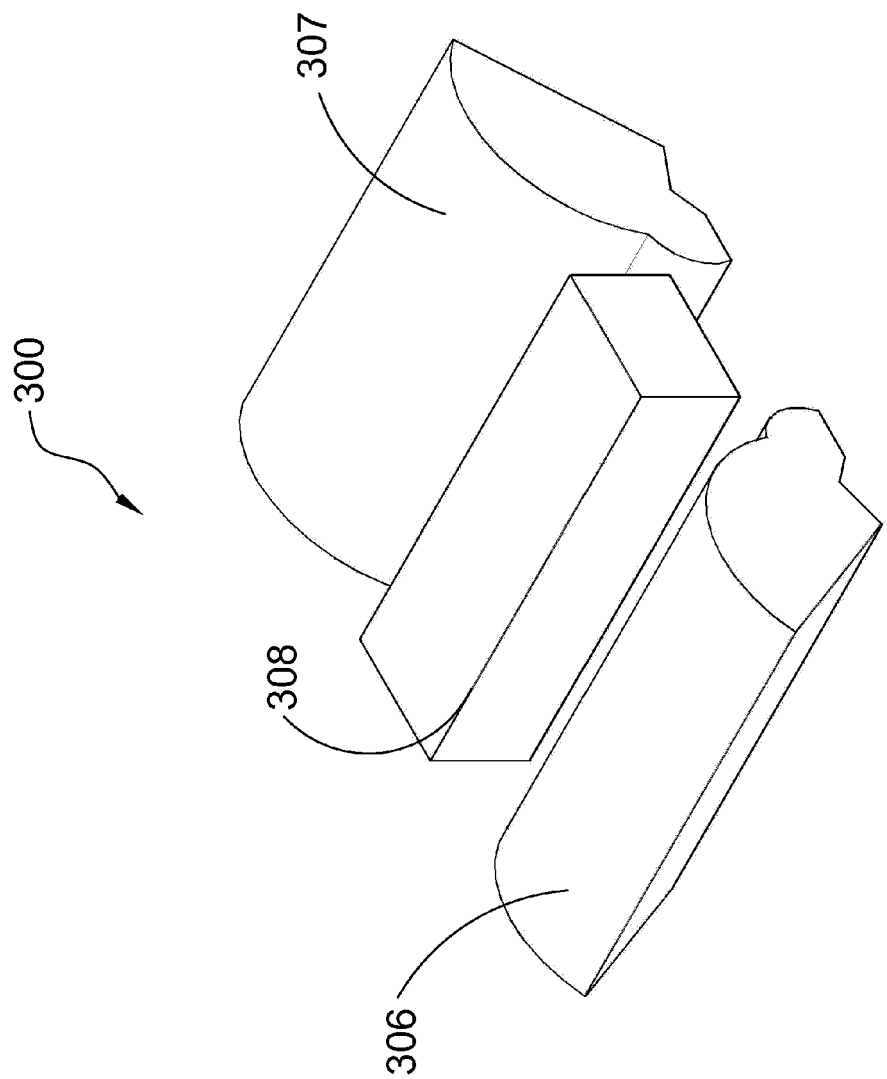
FIG. 6 is a perspective view of the optical cloaking system of FIG. 5.

Referring now to FIGS. 5-6, there is shown an optical cloaking system 300 according to another illustrative embodiment of the present invention. The optical cloaking system 300 includes a pair of optical devices 306, 307, and an object cavity 305 therebetween. The optical devices may be constructed of common optical materials having a positive refractive index similar to the optical devices 106, 107 discussed above, although the devices 306, 307 also specifically include reflective surfaces not included with the devices 106, 107. A first optical device 306 consists of an optical tilted flat surface 331, a parabolic surface with mirror coating 332, a spherical or parabolic surface with mirror coating 333, and a convex surface 334. A second optical device 307 has a symmetrical or mirrored structure to that of the first device 306 and consists of an optical convex surface 335, a spherical or parabolic surface with mirror coating 336, a parabolic surface with mirror coating 337, and a tilted flat surface 338. When an incident light beam 310 with beam width 321 from a light source (not shown) shines on the tilted flat surface 331, because of the refraction of the tilted flat surface 331, the light beam 310 is bent to become the light beam 311 inside the first optical device 306. Then, the light beam 311 goes to the parabolic surface with mirror 332 and reflects back to the focal point 312 on the spherical or parabolic surface with mirror 333, which reflects to the convex surface 334. Because of the converging refraction of the convex surface 334, the light beam 311 is compressed and bent again. The output is a light beam 313 having a beam width 322 and a directivity parallel to the visible incident light beam 310, which corresponds to the light beam 314 having a beam width 323 and a directivity parallel to the visible incident light beam 310.

The light beam 313/314 with a beam width 322/333 travels outside of the cavity 305 and is not obstructed by the object 308 disposed in the cavity. Again, the size, shape, and spacing of the optical devices 306, 307 can be adjusted to accommodate the cavity 305 with an appropriately size and shape for any given object 308.

When light beam 314 shines on the convex surface 335, because of the converging refraction of the convex surface 335, the light beam 314 is decompressed to reach the focal point 315 on the spherical or parabolic surface with mirror 336 and reflects to the parabolic surface with mirror 337 and becomes the light beam 316 inside of the second optical device 307. Then, the light beam 316 goes to the flat surface 338, because of the refraction of the tilted flat surface 338, the light is bent again. The output is a light beam 317 having a beam width 324 and directivity which is the same as the width 321 and directivity of the incident beam 310.

Because the beam width 321 and directivity of light beam 310 are arranged to be same as the outgoing beam width 324 of the light beam 317, a person viewing the optical cloaking device 300 from the direction of the light beam 310, would not see the object between the first optical device 306 and the second optical device 307, but instead would see the background behind the second optical device 307. Thus, while the visible light source 310 shines through the optical cloaking system 300 to fully display the background behind, it indeed cloaks or renders invisible the object 308 in the cavity of 305.

Again, the optical cloaking system 300 achieves essentially the same advantages as the optical cloaking systems 100, 200 of the first and second embodiments. Although the system 300 may arguably be more complicated than other embodiments of the invention, it desirably achieves the shortest longitudinal dimension of the disclosed embodiments.

Figure 7:
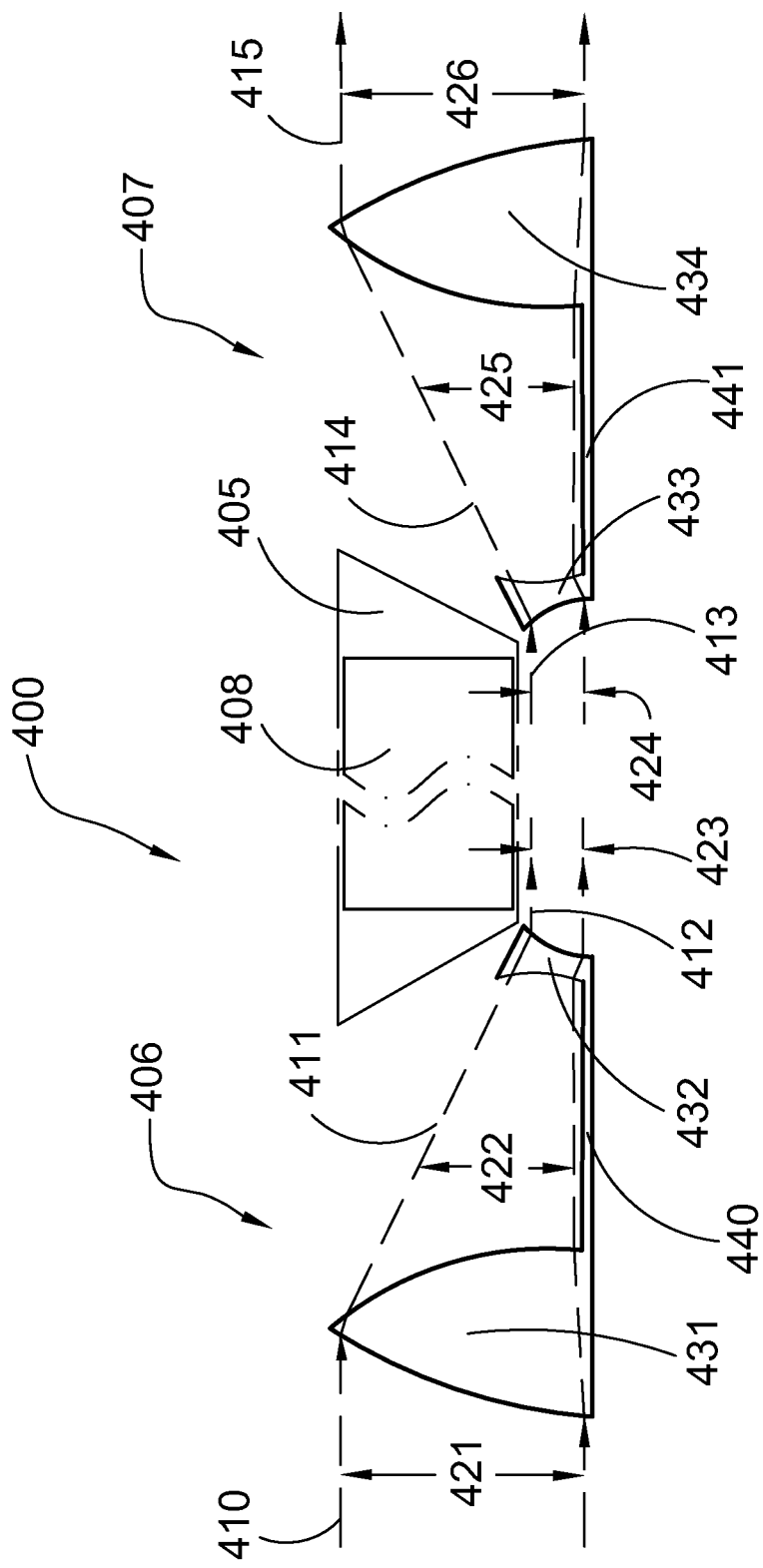
FIG. 7 is a side view of an optical cloaking system according to another illustrative embodiment of the present invention involving optical devices formed using a combination of spaced apart convex and concave cylindric lenses.
Figure 8:
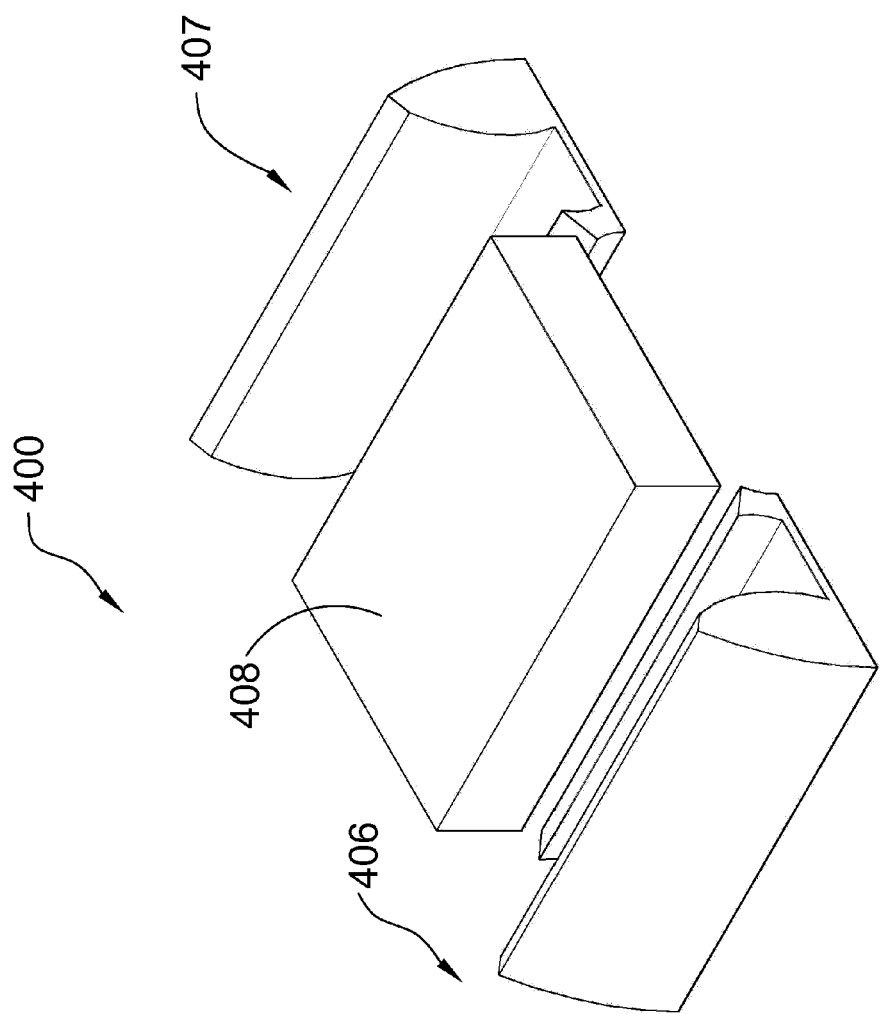
FIG. 8 is a perspective view of the optical cloaking system of FIG. 7.
Figure 10:
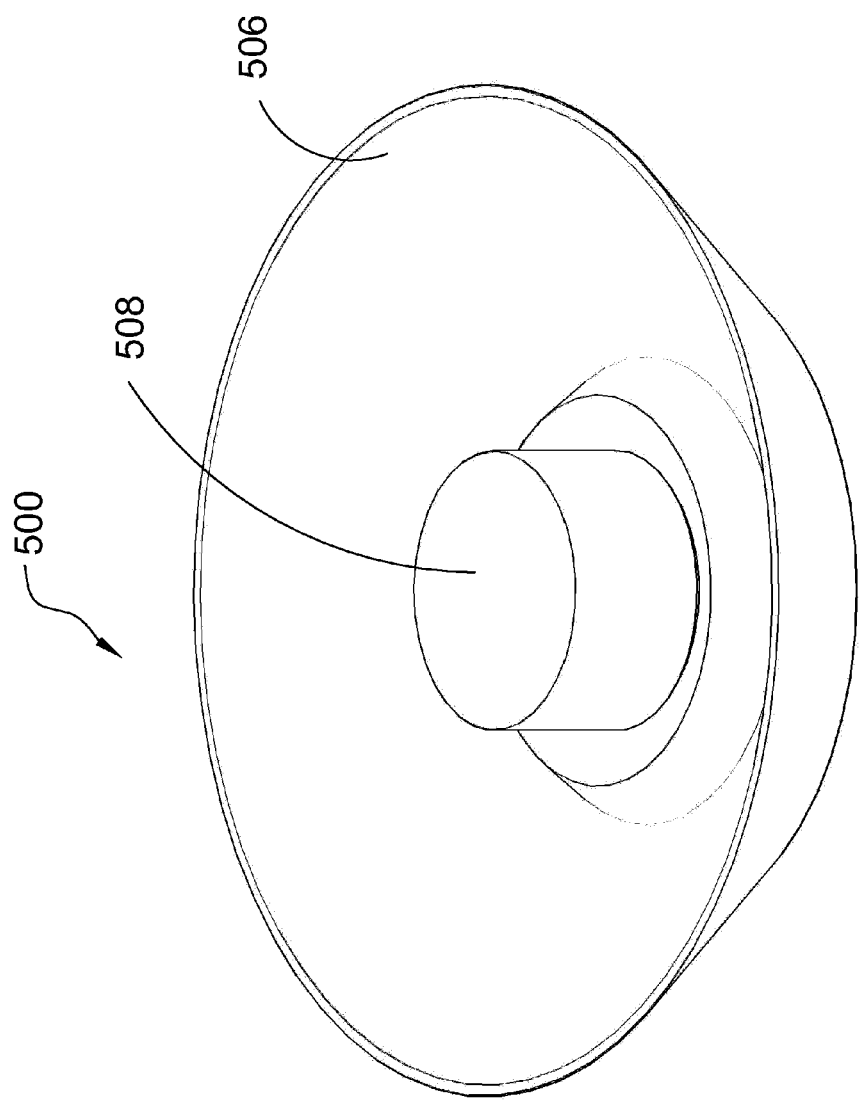
FIG. 10 is a perspective view of the optical cloaking system of FIG. 9A-9B.

Referring now to FIGS. 7-8, there is shown an optical cloaking system 400 including optical devices 406, 407 according to another illustrative embodiment of the present invention. It is especially good to reduce the mass of the optical system by using thin lenses such as Fresnel lenses.

The optical devices 406, 407 may be constructed of common optical materials having a positive refractive index similar to the optical devices 106, 107 in FIGS. 1 and 2 discussed above. The first optical device 406 consists of an first optical member convex lens 431 and optical member concave lens 432, wherein the second optical member 432 has operative surfaces which are spaced apart from the operative surfaces of the first optical member 431, although the optical member 431, 432 are formed integrally and joined via a base portion 440. The second optical device 407 has a structure which is a symmetrical or mirrored structure of the first device 406 and consists of an first optical member convex lens 434 and a second optical member concave lens 433, wherein the second optical member 433 has operative surfaces which are spaced apart from the operative surfaces of the first optical member 434, although the optical member 433, 434 are formed integrally and joined via a base portion 441. An incident light beam 410 from a light source (not shown) passes through the first optical member 431 and is refracted to the second optical member 432. A light beam 412 is output by the member 432 and passes underneath the object cavity 405 and is then decompressed and bent by the first and second optical members 433, 434 of the second optical device 407.

Similar to the optical cloaking system 200 in FIGS. 3 and 4 discussed above, the optical cloaking system 400 of this illustrative embodiment uses the concave and convex lens to compress and decompress the light beam 410 such that the light passes around the object and the object 408 is rendered invisible to an observer. The optical cloaking system 400 of the present embodiment functions essentially the same and achieves essentially the same advantages of the other embodiments discussed above.

While the optical cloaking systems 100, 200, 300, 400 in the above embodiments include a pair of optical devices that are used together for forming an object cavity therebetween, the structures of these systems could be used as guides or building blocks for forming more complex systems. For example, the optical cloaking systems 500, 600, 700, 800, 900 in the following embodiments are achieved using the structure of the system 100 as a guide or building block. Similarly, other more complex systems could be achieves using any of the systems 200, 300, 400 as guides or building blocks.

Referring now to FIGS. 9A, 9B-10, there is shown an optical cloaking system 500 according to another illustrative embodiment of the present invention. The optical cloaking system 500 comprises a single optical device 506 which essentially integrates the optical devices 106, 107 of the first embodiment to form a single unit having an object cavity 505 at center thereof, such that an object 508 disposed in the cavity 505 is completely surrounded (360°) by the unit an will be hidden from view no matter where an observer stands outside of the system 500. The cross-sectional shape of the optical device 506 on one side of the object cavity 505 is essentially the same as that of the first and second optical devices 106, 107 in FIGS. 1 and 2 when viewed from the side. However, the optical device 506 is circular in shape and surrounds the object cavity 505 which has a fixed position and volume in the middle thereof. The light beam 510 from the light source (not shown) travels through a first side of the optical device 506, underneath the object cavity 505, and out an opposing side of the optical device 506 in a manner similar to that of the first illustrative embodiment. However, with a structure as shown in FIGS. 9A, 9B-10, the object is rendered invisible from any side of the object/optical cloaking device, not just the front or back as in the first embodiment, thereby effectively cloaking the object in 360° view.

The optical cloaking system 500 of the present embodiment functions essentially the same and achieves essentially the same advantages of the other embodiments discussed above. For example, the optical cloaking system 500 of the present embodiment renders an object invisible, by allowing visible light has to pass around the object inside the cloak, and then goes out onto its original path. This makes the light look like it travels in a straight line through the cloak as if there is no object within the cavity 505. However, because the object cavity 505 has a fixed location and volume within the optical device 506, it is not possible to simply move optical devices on opposites sides of the cavity 505 toward or away from each other to adjust a longitudinal length of the cavity.

While it is possible to construct the optical cloaking system using variously sized and shaped optical devices as in the embodiments of FIGS. 1-10, it is also possible to construct the optical devices in other forms to hide larger objects or multiple objects.

Figure 11:
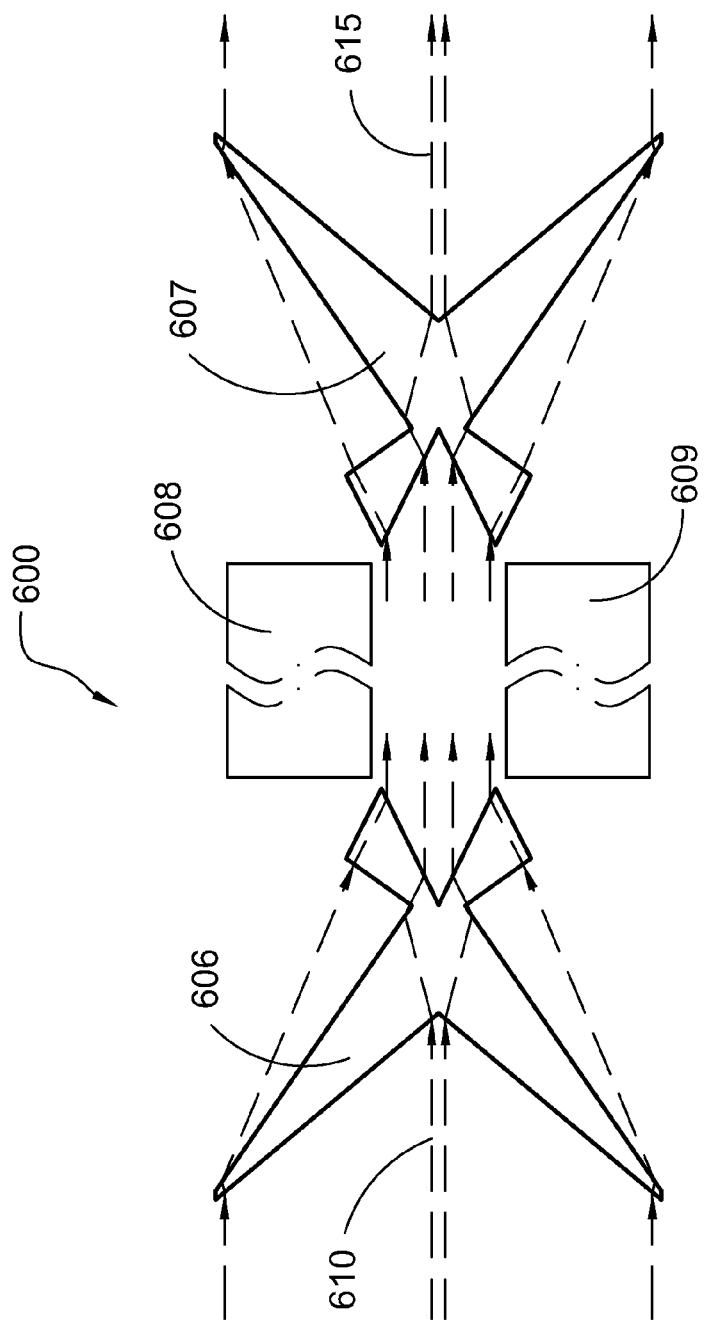
FIG. 11 is a side view of another modification to the optical cloaking system of FIG. 1, wherein the optical devices of the system are each integrally formed with a symmetrical second side arranged such that the optical devices can cloak a pair of objects spaced from each other.
Figure 12:
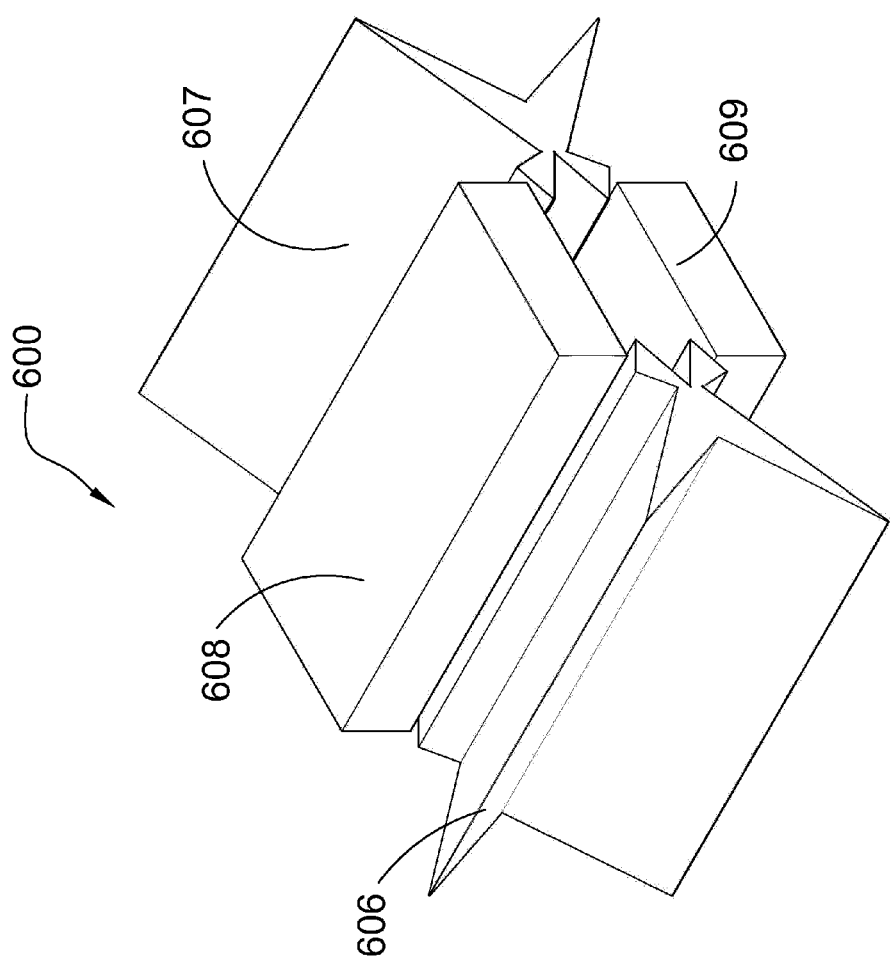
FIG. 12 is a perspective view of the optical cloaking system of FIG. 11.

For example, the optical cloaking system could, instead of being used to cloak a single object, be used to cloak multiple spaced objects at a single time. With reference to FIG. 11-12, there is shown just such an optical cloaking system 600 according to another illustrative embodiment of the present invention. The optical cloaking system 600 comprises a pair of optical devices 606, 607 each involving multiple prisms joined together similar to the optical devices 106, 107 of the first embodiment, but wherein each optical device is integrally formed with a symmetrical second portion arranged below a first portion and joined together along a plane corresponding to the bottom support surface 101*a* of the optical device 106. As depicted, the optical cloaking system 600 can cloak a pair of objects 608 and 609 spaced vertically from each other and placed within respective object cavities of the system. In FIGS. 11, 12 the object cavities are not specifically outlined with broken lines as are the object cavities in FIGS. 1-10, and are not numbered. The structure of the optical cloaking system 600 according to this illustrative embodiment is similar to the embodiment shown in FIGS. 1 and 2 with the optical devices 606, 607 symmetrically disposed on opposite sides of the object cavities. The system 600 of this embodiment functions substantially the same as the system 100 of the first embodiment except that a central space is defined between the two object cavities 608, 609 through which the compressed light passes in a direction parallel to the direction of the incident light 610 for passing around the objects 608, 609 within the object cavities and which is essentially twice as large in height as the space through which the compressed light beam 112/113 passes beneath the object cavity 105 in the first embodiment.

The optical cloaking system 600 of the present embodiment functions essentially the same and achieves essentially the same advantages of the other embodiments discussed above, although this system 600 can cloak two objects spaced from each other rather than a single object. For example, the optical cloaking system 600 of the present embodiment renders two objects 608, 609 invisible, by allowing visible light has to pass around the objects via the optical devices 606, 607, and then goes out onto its original path. This makes the light look like it travels in a straight line through the cloak as if there are no objects within.

Figure 13:
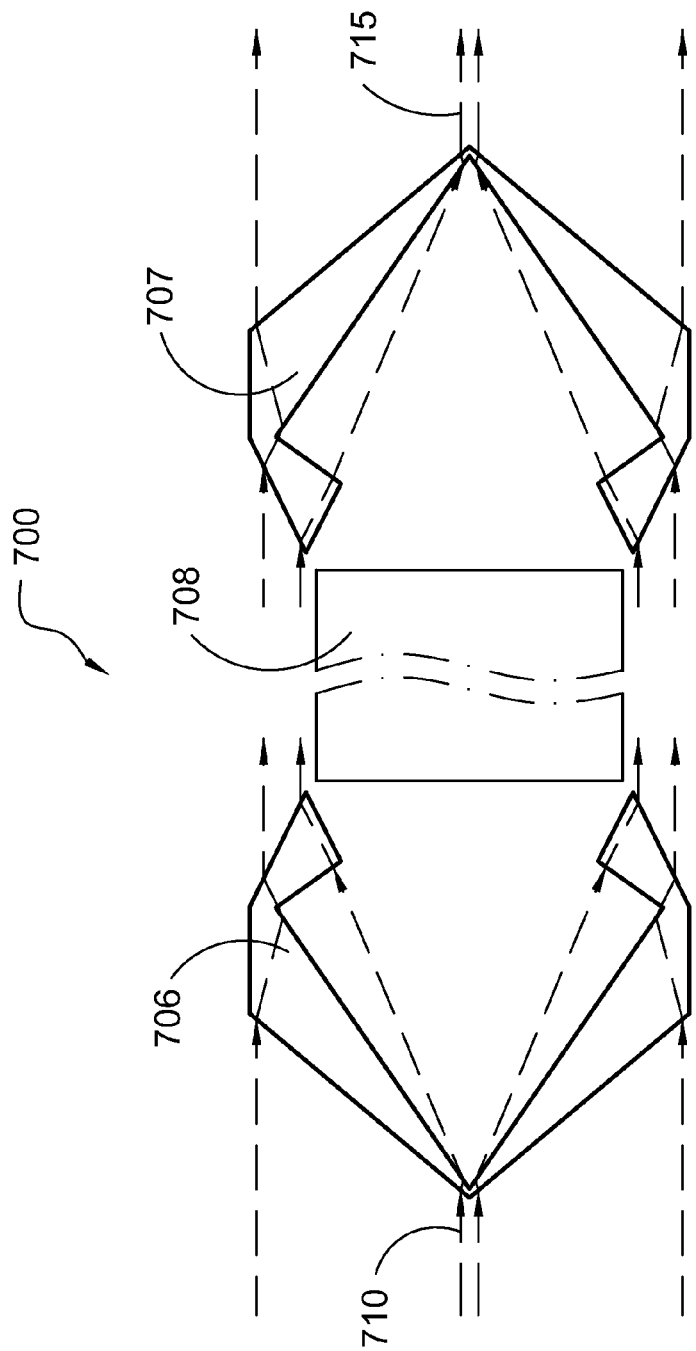
FIG. 13 is a side view of another modification to the optical cloaking system of FIG. 1, wherein the optical devices of the system are each integrally formed with a symmetrical second side arranged such that the optical devices can cloak a single larger-size object disposed therebetween.
Figure 14:
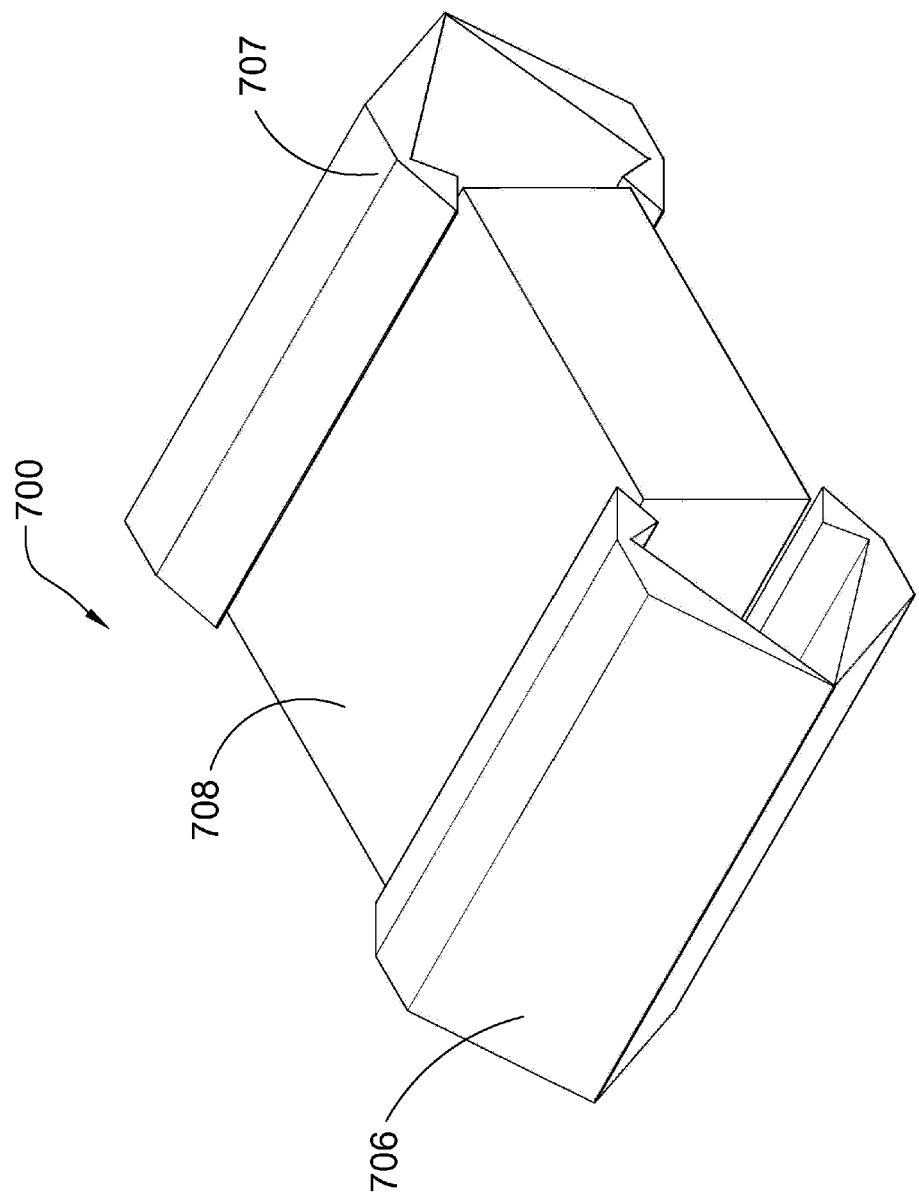
FIG. 14 is a perspective view of the optical cloaking system of FIG. 13.

Still another modification to the embodiment shown in FIGS. 1, 2 is depicted in FIGS. 13-14. An optical cloaking system 700 as shown includes a pair of optical devices 706, 707, and an object cavity therebetween and in which an object 708 is disposed. Again, the object cavity is not specifically depicted in FIGS. 13-14. This modification is somewhat opposite to the modification shown in FIGS. 11-12 in that the optical devices 706, 707 each involve multiple prisms joined together similar to the optical devices 106, 107 of the first embodiment, but wherein each optical device is integrally formed with a symmetrical second portion arranged below a first portion and joined together at a point corresponding to the point 101c of the optical device 106, which is in a plane running along a center of the object cavity. In the optical cloaking system 700 according to this embodiment, the optical devices 706, 707 compress and bend a light beam 710 incident thereon very similarly to the optical devices 106, 107, but such that an upper half of the beam 710 is compressed and passes in a direction parallel to the incident beam 710 above the object cavity, while a lower half of the beam is compressed and passes in a direction parallel to the incident beam 710 below the object cavity. The first and second optical devices 706, 707 are disposed symmetrically to each other on opposite sides of the object cavity, whereby the incident light beam 710 coming from the light source (not shown) is not only bent around and underneath the object cavity, but is also bent around and on top of the object cavity, such that the light beam 715 exiting the second optical device 707 has the same width and directivity as the incident light beam 710.

The optical cloaking system 700 of the present embodiment functions essentially the same and achieves essentially the same advantages of the other embodiments discussed above. For example, the optical cloaking system 700 renders an object 708 in the object cavity invisible, by allowing visible light has to pass around the object inside the object cavity, and then goes out onto its original path. This makes the light look like it travels in a straight line through system as if there is no object within.

However, because the incident light passes both above and below the object cavity, the optical devices 706, 707 may have a shorter longitudinal dimension, but greater latitudinal dimension, in comparison to the optical devices 106, 107 for creating an object cloaking cavity with a given height.

Figure 15:
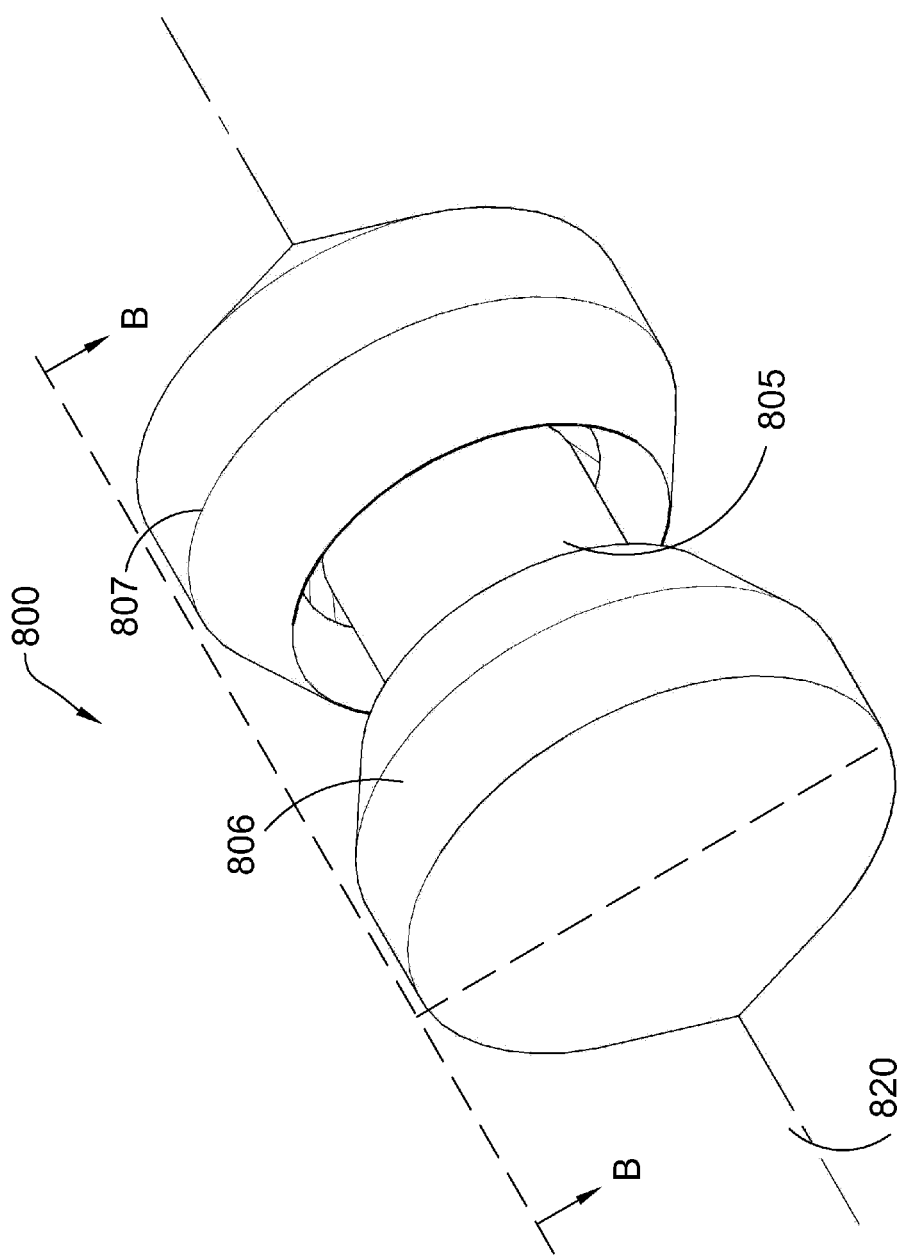
FIG. 15 is a perspective view an optical cloaking system similar to that of FIGS. 13-14, but wherein each of the pair of optical devices is formed with a circular/tubular peripheral shape rather than a linear peripheral shape such that a cylindrically-shaped cloaking space is formed therebetween, rather than the rectangular box-shaped cloaking space in the system of FIGS. 13-14.
Figure 16:
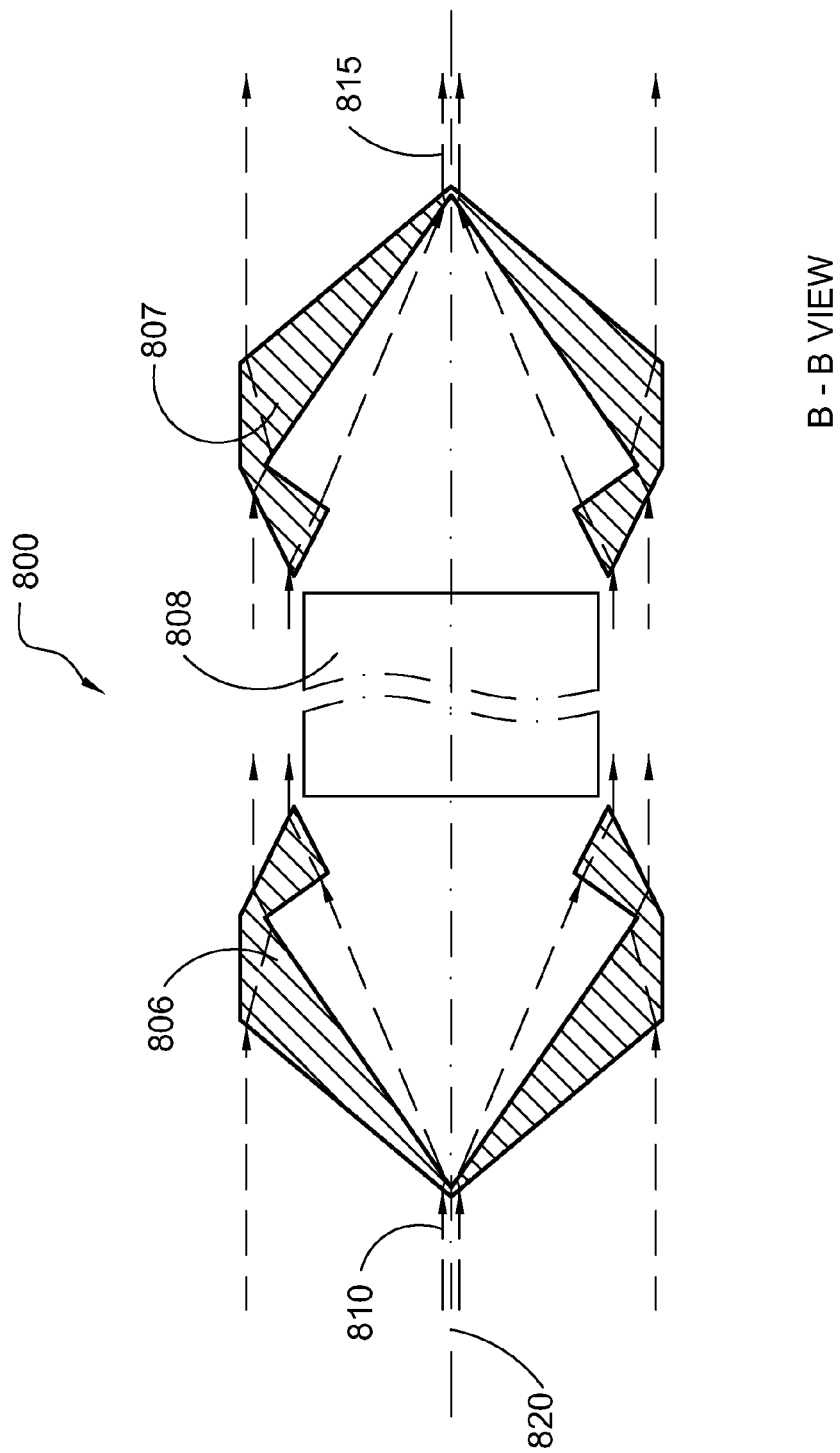
FIG. 16 is a cross-sectional view of FIG. 15 taken along the line B-B cut through the axis.
Figure 17:
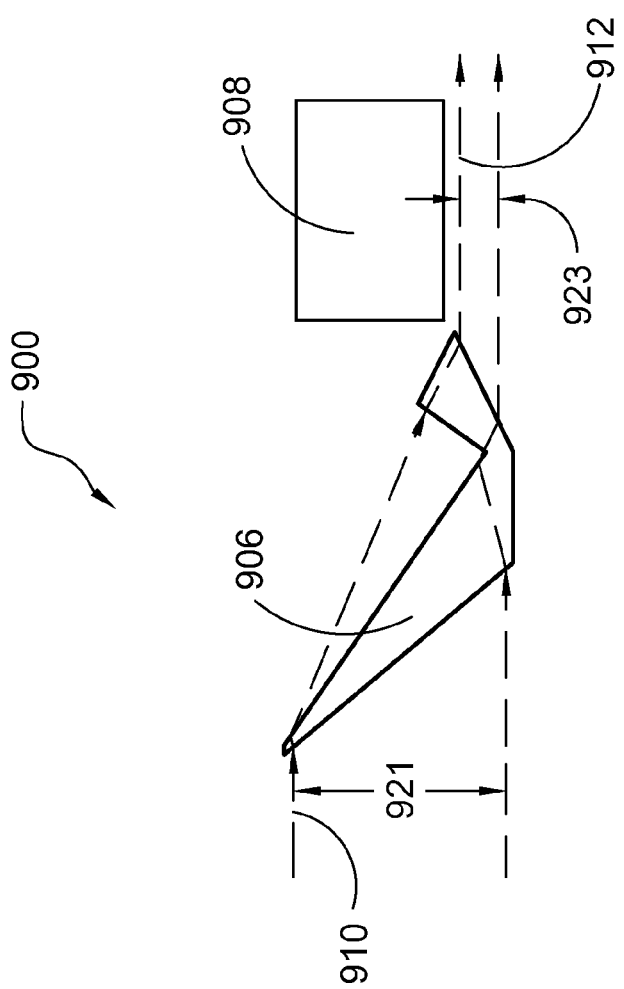
FIG. 17 is a side view of an optical cloaking system similar to that of FIG. 1, but wherein only a single optical device is disposed on one side of an object for concealing the object only when viewed from the one side.
Figure 18:
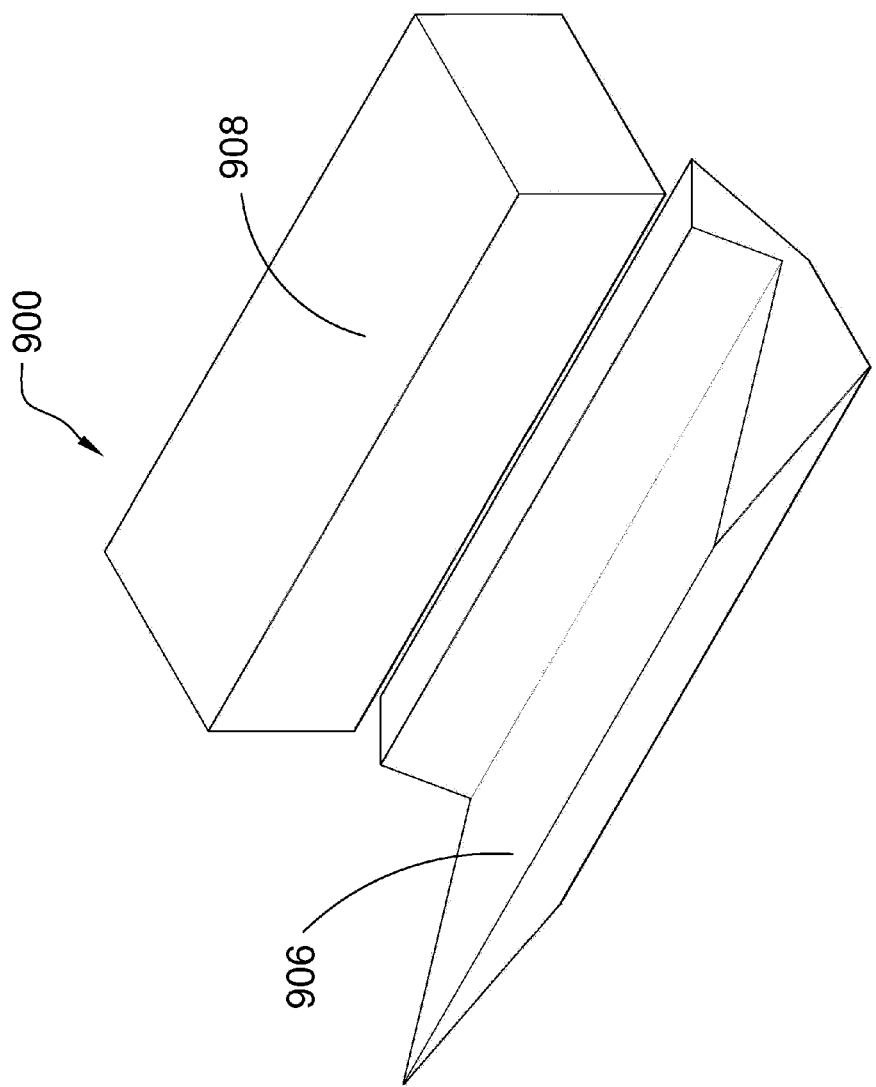
FIG. 18 is a perspective view of the optical cloaking system of FIG. 17.

Still another example of a cloaking system 800 according to the invention is shown in FIGS. 15, 16. The system 800 includes optical devices 806, 807 and is somewhat similar to the embodiment shown in FIGS. 13-14, as best understood by the great similarity between FIGS. 13 and 16, in which FIG. 13 is a side view of FIG. 14, while FIG. 16 is a cross-sectional view of FIG. 15 taken along the line B-B cut through the axis 820. The primary difference between the systems 700 and 800 is that in the system 800 each of the pair of optical devices 806, 807 is formed in a cup shape with one open end and one closed end, and with an outer peripheral surface which is circular in diameter, rather than a linear peripheral shape with flat cut ends as with the optical devices 706, 707 in the system 700 of FIGS. 13-14. When the optical devices 806, 807 are disposed with their open ends facing each other, a cylindrically-shaped object cavity 805 is formed therebetween, rather than the box-shaped object cavity in the system 700 of FIGS. 13-14. By using two cup shaped optical devices 806, 807 to form the cylindrically shaped object cavity 805, object 808 disposed within the cavity will be hidden from view of an observer with less dependence on where the observer stands relative to either of the optical devices 806, 807.

The optical cloaking system 800 of the present embodiment functions essentially the same and achieves essentially the same advantages of the other embodiments discussed above, especially the system 700 in FIGS. 13-14. The optical cloaking system 800 of the present embodiment renders an object invisible, by allowing visible light has to pass around the object inside the cloak, and then goes out onto its original path. This makes the light look like it travels in a straight line through the cloak as if there is no object within.

While each of the above illustrative embodiments have included a optical device both in front of and behind the object cavity, in some cases it may not be necessary to use a pair of optical devices, e.g., in situations where a background image is one continuous color such as a blue ocean or blue sky, and any distortion of the background image generated by the system would not be easily perceptible to an observer. As still a further example, depicted in FIGS. 17-18, the optical cloaking system 900 is similar in construction to the optical cloaking device 100 of the first embodiment, except that the optical cloaking system 900 of this embodiment includes only a single optical device 906 in front or on one side of an object 908 disposed in an object cavity. The incident light beam 910 with the beam width 921 passes through the optical device 906 in the same manner to that of the light beam 110 passing through the first optical prism 106 of the first embodiment. When the incident light beam 910 with beam width 921 shines on the optical device 906, it is compressed and bent to become the visible light 912 with beam width 923 and passes below the object cavity parallel to the incident beam 910. However, because the beam width 923 of light beam 912 is smaller than the beam width 921 of the light beam 910 incident on the device 906, any background image behind the cloaked cavity 905 is magnified in a latitudinal direction, such the displayed background image may appear distorted to an observer standing on the side of optical device opposite to the object 908. However, if the distortion of background image is not important, the optical cloaking system 900 is advantageously less expensive and half the size as the system 100 because it does not include a second optical device. For example, such an optical cloaking system may be advantageous if attempting to cloak a ship at sea because the background image is mostly blue and distortions in the image would not be readily perceptible to an observer.

The optical cloaking system 900 of the present embodiment functions essentially the same and achieves essentially the same advantages of the other embodiments discussed above.

The present invention is not limited in its application to the details of construction and to the dispositions of the components set forth in the foregoing description or illustrated in the appended drawings in association with the present illustrative embodiments of the invention. The present invention is capable of other embodiments and of being practiced and carried out in various ways. In addition, it is to be understood that the phraseology and terminology employed herein are for the purposes of illustration and example, and should not be regarded as limiting.

As such, those skilled in the art will appreciate that the concepts, upon which this disclosure is based, may readily be utilized as a basis for the designing of other structures, methods and systems for carrying out the several purposes of the present invention. It is important, therefore, that the claims be regarded as including such equivalent constructions.

For example, the number of prisms/mirrors/lenses is not limited to two, but instead may have multiple prisms/mirrors/lenses on both sides of the object cavity. By using multiple prisms/mirrors/lenses on both sides of the object cavity, it is possible to reduce the size and thickness of the prisms without reducing the size of the object cavity.

As still another example, the above invention can be used to project an image of an object in place of a hidden object, instead of merely hiding an object within the object cavity. For example, it is possible to place a small object, such as figurine or image of a person or animal, a building, a piece of equipment, etc., any where along the path of the compressed light beam where the compressed light beam passes around the object cavity e.g., where compressed beam 112 passes below the object cavity 105 in FIG. 2, and such object will appear life size to an observer standing outside of the system. This would allow for the object to be disguised as opposed to just hidden from view.

Further still, the above invention can be used in a variety of practical applications including, but not limited to, covert military and intelligence operation to hide personnel and/or equipment, as an invisibility shield or invisibility cloak for seeing through buildings to open wide and broad view, as a novelty item or a child's toy, etc.

What is claimed is:

1. An optical cloaking system consisting of:
    a first optical device which is transparent and formed entirely of material with a positive refractive index; and
    a second optical device which is transparent and formed entirely of material with a positive refractive index, wherein
    the first and second optical devices have a same shape, are configured to be disposed symmetrically to each other on opposite sides of an adjacent object to be cloaked, and which jointly create a cloaked object cavity between the optical devices encompassing the adjacent object from the viewpoint of an observer positioned with either of the optical devices between the observer and the object,
    the first optical device comprises a first portion which compresses and bends, only by refraction in substantially only one direction, light rays entering the first portion at a predetermined angle to a direction at which the light enters the first portion, and passes the compressed and bent light, and a second portion which receives the compressed and bent light rays which are passed from the first portion, which further alters a size ratio of and bends the received light rays only by refraction in substantially the same direction as the first portion, and which emits the further altered and bent light rays in a direction substantially parallel to the direction at which the light rays enter the first portion,
    the second optical device comprises a third portion which receives the further altered and bent light rays which are emitted from the second portion, alters a size ratio of and bends the received light rays only by refraction in a manner opposite to the second portion, and passes the light rays, and a fourth portion which receives the light rays passed from the third portion, bends and decompresses the light rays only by refraction in a manner opposite to the first portion, and emits the light rays with a size ratio and directivity the same as the light rays which enter the first portion,
    said first and second optical devices are movable relative to each other so that a size of the cloaked object cavity is variable based on a distance between the first and second optical devices.

2. An optical cloaking system according to claim 1, wherein a bottom surface of each of the first and second optical devices is flat.

3. An optical cloaking system according to claim 1, wherein each of the first and second optical devices is a self-supporting member such that an observer can view a background behind each of the first and second optical devices without any obstruction and seamlessly right up to the outer peripheral edges each of the first and second optical devices.

4. An optical cloaking system according to claim 1, wherein each of said optical devices is a continuous molded member or a continuous extruded member.

5. An optical cloaking system according to claim 1, wherein the second portion of the first optical device emits the further altered and bent light rays such that they pass through a space adjacent one face of the cloaked object cavity, said space having a size less than one half of a size of the cloaked object cavity.

* * * * *